SPEED REDUCING MECHANISM

Original Filed Jan. 2, 1969 3 Sheets-Sheet 1

INVENTOR
ARVID DAHLSTROM

BY Robert E. Sudberg
ATTORNEY

SPEED REDUCING MECHANISM

Original Filed Jan. 2, 1969 3 Sheets-Sheet 2

INVENTOR
ARVID DAHLSTROM

BY

ATTORNEY

SPEED REDUCING MECHANISM

Original Filed Jan. 2, 1969 3 Sheets-Sheet 3

INVENTOR
ARVID DAHLSTROM
BY
ATTORNEY

United States Patent Office

Re. 28,122
Reissued Aug. 20, 1974

28,122

SPEED REDUCING MECHANISM

Arvid Dahlstrom, Chicago, Ill., assignor of a fractional part interest to Norman H. Andreasen, Northbrook, Ill.

Original No. 3,557,631, dated Jan. 26, 1971, Ser. No. 798,243, Jan. 2, 1969. Application for reissue Nov. 21, 1972, Ser. No. 308,506
Int. Cl. F16d *21/00*
U.S. Cl. 74—125.5 8 Claims

Matter enclosed in heavy brackets [ ] appears in the original patent but forms no part of this reissue specification; matter printed in italics indicates the additions made by reissue.

ABSTRACT OF THE DISCLOSURE

A speed reducing mechanism characterized by the absence of a gear train and comprising a driven shaft having an eccentric cooperating with a rock shaft connected through the medium of a one-way clutch to a driven shaft. In an embodiment of the invention the angular movement of the rock shaft can be varied from zero to a desired maximum. In a further embodiment of the invention the single drive shaft operates a pair of rock shafts each in turn connected through one-way clutch means to a driven shaft.

With the foregoing considerations in mind it is a principal object of the invention to provide an improved speed reducing mechanism characterized by the absence of a gear train.

Another object is to provide a speed reducing mechanism capable of variable adjustment from zero speed to maximum speed.

DRAWINGS

SPECIFICATION

Figure 1:
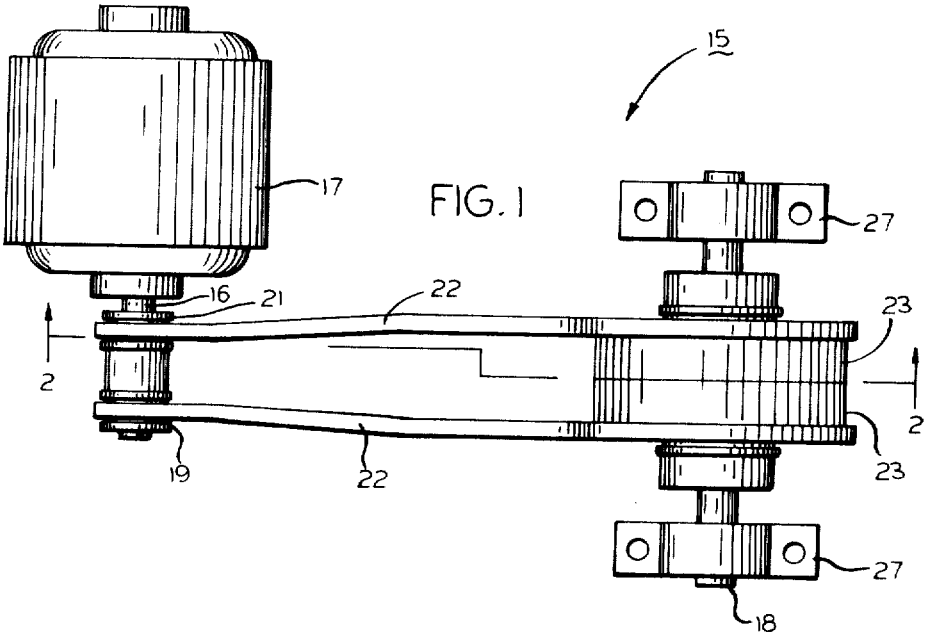
FIG. 1 is a plan view of a speed reducing mechanism embodying the improvements according to the present invention.
Figure 2:
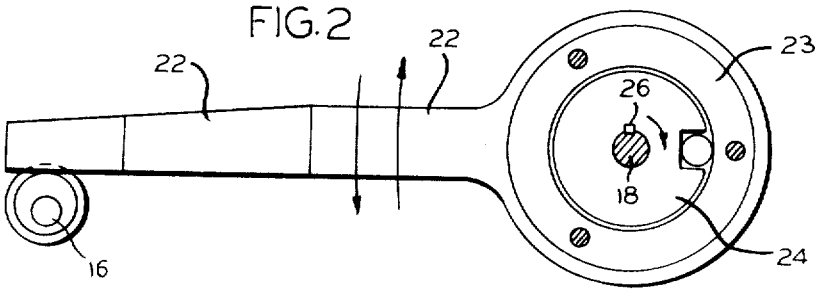
FIG. 2 is an elevational view looking in the direction of the arrows 2—2 of FIG. 1.

The improved speed reducing mechanism according to a first embodiment of the invention is denoted by the reference numeral 15 and includes a power shaft 16 driven by a prime mover 17 in the form of an electric motor. The latter is adapted by the structure according to the present invention to drive a driven shaft at a greatly reduced speed without the instrumentality of a gear train.

The speed reducing mechanism includes a pair of eccentrics 19 and 21 fast on the power shaft 16. These are phased 180° apart. Each eccentric is contacted by a rock arm 22 terminating in a clutching member 23 concentric with the driven shaft 18 and cooperating with a clutched member 24 fast by a key 26 to shaft 18.

The latter is supported in pillow blocks 27 at each end thereof. It will be understood that driven shaft 18 has a load, not shown, connected thereto, so that power is transmitted from prime mover 17 to driven shaft 18, the latter having a very small speed as compared to the speed of prime mover 17.

Figure 4:
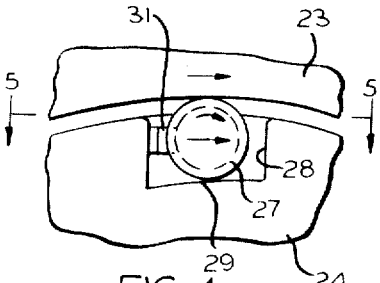
FIG. 4 is a detail of a one-way clutch employed with the structure of FIG. 1.
Figure 3:
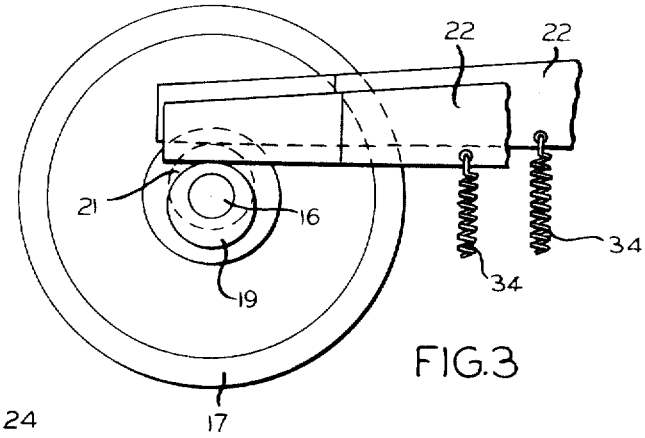
FIG. 3 is a detailed elevational view showing eccentrics mounted on a power shaft and rock arms cooperating therewith.
Figure 5:
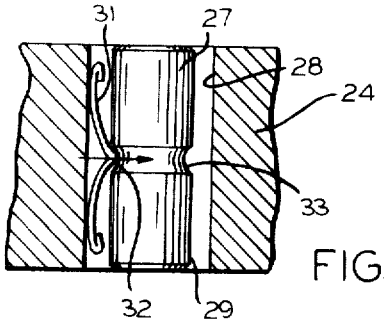
FIG. 5 is a view looking in the direction of the arrows 5—5 of FIG. 4.

The clutching connection between clutching member 23 and clutched member 24 is achieved by a roller sprag 27 held in a slot 28 in clutched member 24. Slot 28 has an inclined ramp surface 29 which is inclined as seen in FIG. 4. The pitch if the ramp surface 29 is exaggerated in FIG. 4, but clockwise movement of each rock arm 22 causes its clutching member 23 to roll the roller sprag 27 "up" the ramp surface to create a clutching connection with clutched member 24 by pinching roller sprag 27 between members 23 and 24.

Roller sprag 27 is additionally urged in a clutching direction by an leminiscate shaped spring 31 having its apex 32 engaged in an annular slot 33 in roller sprag 27.

On counter clockwise movement of arm 22 the clutching action is relieved. It will thus be seen that the two arms 22 alternate in their action to move driven shaft 18 through a small angle of rotation. The two arms and the clutches thus impart rotation to shaft 18 at a very small speed as compared to the speed of the power shaft 16.

Each rock shaft 22 is connected to a tension spring 34 in turn connected to a spring abutment, not shown, to hold the rock shafts 22 against their respective eccentrics 19 and 21.

Figure 6:
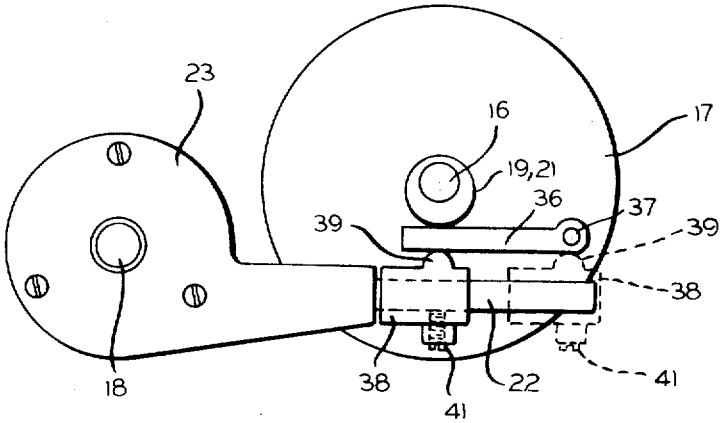
FIG. 6 is an elevation view showing mechanism for adjusting the speed reduction ratio.
Figure 7:
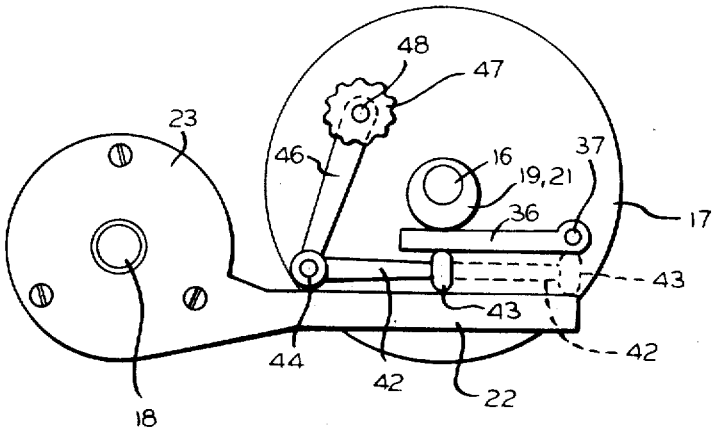
FIG. 7 is an elevation view showing another embodiment of mechanism for adjusting the speed reduction ratio.

Structure is provided for varying the speed reduction ratio, and as seen in FIGS. 6 and 7, an intermediate rock arm 36 is pivoted at 37 to the prime mover 17 and contacts the eccentrics 19 or 21 as the case may be.

In FIG. 6 rock arm 22 is provided with a slide 38 having a protuberance 39 thereon engageable with intermediate rock arm 36 through its length. The position of slide 38 on rock arm 22 is locked by a set screw 41 threaded thereinto. When protuberance 39 is opposite eccentric 19 or 21 the speed reduction ratio is smallest, the ratio increasing as the slide is opposite pivot point 37, when no motion is transmitted to driven shaft 18.

In FIG. 7 there is shown another arrangement for varying the speed reduction ratio. Parts common with the form seen in FIG. 6 are referred to by the same reference numeral. In this embodiment adjustment rod 42 having an arm contacting shoe 43 at the end thereof is movable between the positions shown to vary the speed reduction ratio in the manner seen with respect to FIG. 6.

Rod 42 is pivotally connected at 44 to an adjusting arm 46 which can be rocked to a desired setting by a control knob 47, arm 46 and knob 47 having a turning center at 48.

Figure 8:
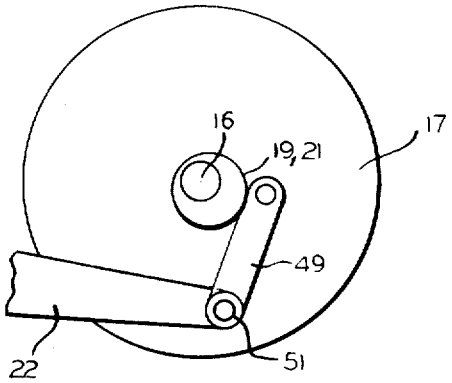
FIG. 8 is an alternative view of a rock arm.

Referring now to FIG. 8, there is shown an embodiment where the rock arm 22 contacts eccentric 19 or 21 through arm 49 rigidly connected at 51 to rock arm 22.

Figure 9:
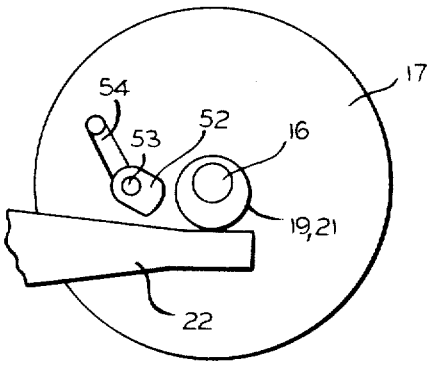
FIG. 9 is a view of mechanism for releasing driving connection with the speed reducing mechanism.

In FIG. 9 there is shown an arrangement whereby the driving connection between power shaft 16 and driven shaft 18 can be interrupted by throw out member 52 turning on shaft 53 by lever 54 to move member 52 against rock arm 22 to rock the same out of contact with eccentric 19 or 21.

Figure 10:
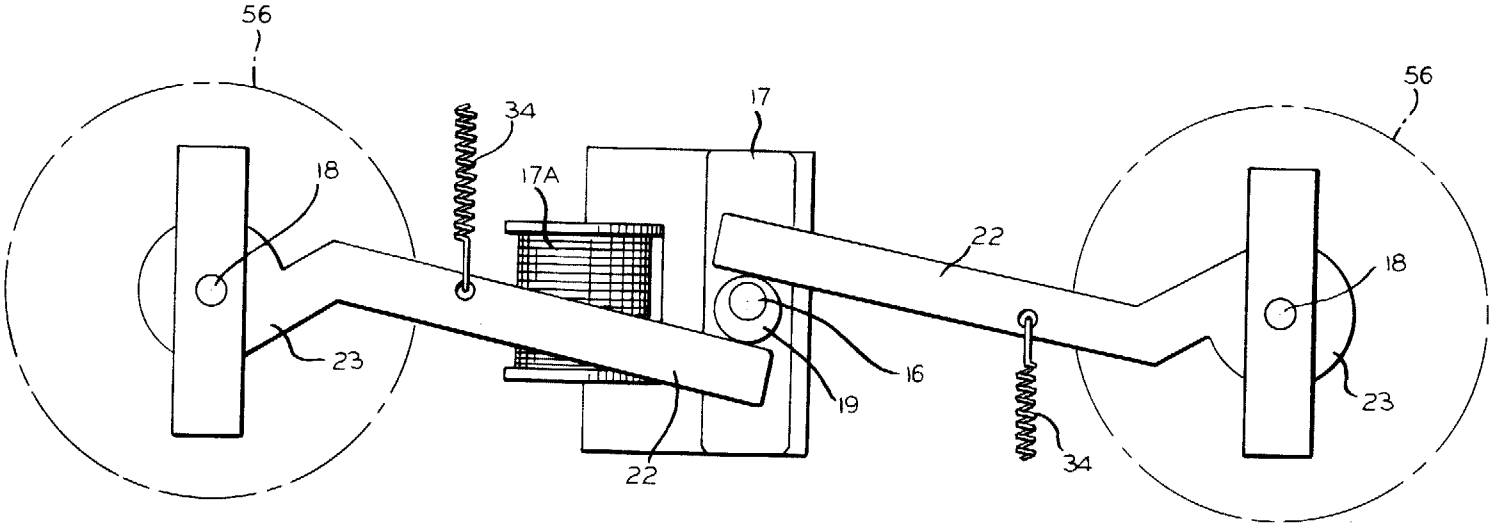
FIG. 10 is a plan view of another embodiment of the invention.

In FIG. 10 there is shown a form of the invention especially suited for a moving advertising display. In this form of the invention the prime mover 17 may be in the form of a shaded pole motor having a driving coil 17A. In this form of the invention two driven shafts 18 are disposed on opposite sides of power shaft 16, each rock arm 22 having a clutching connection with a driven shaft in the manner previously described. Each driven shaft 18 may drive a turntable 56 or some other device having movement.

I claim:

1. In a speed reducer mechanism, a power shaft, a driven shaft, spaced from said power shaft, means for drivably connecting said power shaft to said driven shaft whereby said driven shaft is driven at a speed greatly less than the speed of said power shaft, said means comprising;

(a) an eccentric mounted on said power shaft;

(b) one-way clutch means including a clutched member mounted on said driven shaft;

(c) a rock arm extending between said power shaft and said driven shaft and cooperating with said eccentric, having a clutching member mounted thereon cooperating with said clutched member to rock said clutched member upon rocking movement in one direction of said rock arm and to impart an increment of angular movement to said driven shaft, and to release connection with said clutched member upon rocking movement in another direction;

(d) and means for varying the amplitude of movement of said rock arm to vary the increment of angular movement imparted to said clutched member comprising;

(i) an intermediate rock arm having a fixed pivot point;

(ii) said intermediate rock arm contacting said eccentric;

(iii) a member movable along said first named rock arm and contacting said intermediate rock arm;

(iv) said member being positionable along said first named rock arm at a point opposite said eccentric to give maximum angular movement to said first named rock arm, and being;

(v) movable to a position opposite said fixed pivot point to give zero amplitude of movement to said first named rock arm.

2. A speed reducer according to amended claim 1 wherein said member is adjustably mounted on said first named rock shaft.

3. A speed reducer mechanism according to amended claim 1 wherein structure is provided for adjusting said member to positions between those of maximum and zero amplitude of said first named rock arm.

*4. A speed reducer mechanism for drivably connecting a rotating power shaft to a driven shaft comprising an*

*eccentric means coupled to a power shaft, first and second rock arms operatively coupled to the eccentric means for effecting intermittent rocking movement of the rock arms upon rotation of the power shaft,*

*said rock arms being pivoted mounted about an axis coaxial to the longitudinal axis of a driven shaft, said first and second rock arms having first and second clutch members respectively lie in confronting relationship to each other in concentric relationship to the longitudinal axis of the driven shaft.*

*a clutched member coupled to the driven shaft in operative relation to said first and second clutch members, and*

*connection means operatively imposed between the said first and second clutch members and the clutched member to alternately transmit motion in a predetermined direction from the first and second clutch members to the clutched member for rotating the driven shaft at a reduced speed.*

*5. The speed reducer mechanism of Claim 4 wherein the first and second clutch members each includes an inner cylindrical surface that surrounds in spaced relation the outer cylindrical peripheral surface of the second clutched member.*

*6. The speed reducer mechanism of Claim 5 wherein the connection means is mounted for reciprocal movement on an inclined surface provided on the periphery of the clutched member wherein the connection means contacts either the first or second clutch member and transmits motion to the clutched member at one position of the connection means along the inclined surface.*

*7. The speed reducer mechanism of Claim 6 wherein the connection means comprises a roller sprag.*

*8. A speed reducer mechanism for drivably connecting a rotating power shaft to a driven shaft comprising an*

*eccentric means coupled to a power shaft,*

*rock arm means operatively coupled to the eccentric means for effecting intermittent rocking movement of the rock arm means upon rotation of the power shaft,*

*said rock arm means being pivoted mounted about an axis coaxial to the longitudinal axis of a driven shaft,*

*clutch means operatively connecting said rock arm means and the driven shaft to transmit intermittent motion thereto,*

*said clutch means including a first clutch member connected to the rock arm means for intermittent movement therewith and a second clutch member connected to the driven shaft,*

*connection means operatively imposed between the first clutch member and the second clutch member to transmit motion in a predetermined direction from the first clutch member to the second clutch member for intermittently rotating the driven shaft,*

*said first and second clutch member are mounted concentrically of the longitudinal axis of the drive shaft,*

*the first clutch member includes an inner cylindrical surface that surrounds in spaced relation the outer cylindrical peripheral surface of the second clutch member,*

*the connection means is mounted for reciprocal movement on an inclined surface provided on the periphery of the second clutch member wherein the connection means contacts the first clutch member and transmits motion to the second clutch member at one position of the connection means along the inclined surface,*

*said connection means including a roller sprag having a slot, and*

*an elongated spring having a bent portion inserted in said slot and urging the roller sprag up the inclined surface.*

References Cited

The following references, cited by the Examiner, are of record in the patented file of this patent or the original patent.

UNITED STATES PATENTS

| | | | |
|---|---|---|---|
| 3,071,990 | 1/1963 | Uhtenweldt | 74—117 |
| 2,384,110 | 9/1945 | Malmquist | 74—116 |
| 2,507,756 | 5/1950 | Boylan | 74—112 |
| 2,945,169 | 7/1960 | Carr | 74—116 |
| 1,735,923 | 11/1929 | Helgeby | 74—116 |
| 3,340,743 | 9/1967 | Stageberg | 74—116 |
| 3,447,391 | 6/1969 | Hargreaves et al. | 74—125.5 |

SAMUEL SCOTT, Primary Examiner

W. S. RATLIFF, Jr., Assistant Examiner

U.S. Cl. X.R.

74—116